United States Patent
Joensen

(10) Patent No.: US 10,662,919 B2
(45) Date of Patent: May 26, 2020

(54) ROTOR HUB FOR A WIND TURBINE HAVING PRE-POSITIONED FASTENERS AND RELATED METHOD

(71) Applicant: Vestas Wind Systems A/S, Aarhus N. (DK)

(72) Inventor: Høgne Joensen, Viborg (DK)

(73) Assignee: Vestas Wind Systems A/S, Aarhus N. (DE)

( * ) Notice: Subject to any disclaimer, the term of this patent is extended or adjusted under 35 U.S.C. 154(b) by 127 days.

(21) Appl. No.: 16/064,205

(22) PCT Filed: Dec. 20, 2016

(86) PCT No.: PCT/DK2016/050449
§ 371 (c)(1),
(2) Date: Jun. 20, 2018

(87) PCT Pub. No.: WO2017/108054
PCT Pub. Date: Jun. 29, 2017

(65) Prior Publication Data
US 2018/0372064 A1    Dec. 27, 2018

(30) Foreign Application Priority Data

Dec. 22, 2015  (DK) ................................ 2015 70861

(51) Int. Cl.
*F03D 1/06* (2006.01)
*F03D 80/00* (2016.01)
(Continued)

(52) U.S. Cl.
CPC ......... *F03D 1/0658* (2013.01); *F03D 7/0224* (2013.01); *F03D 80/00* (2016.05);
(Continued)

(58) Field of Classification Search
CPC ........ F03D 1/0658; F03D 80/00; F03D 80/50; F03D 80/80; F03D 80/88; F05B 2260/301
See application file for complete search history.

(56) References Cited

U.S. PATENT DOCUMENTS

2010/0129216 A1    5/2010  Bagepalli et al.
2011/0142655 A1    6/2011  Chen et al.
(Continued)

FOREIGN PATENT DOCUMENTS

CN    101265874 A    9/2008
CN    101737251 A    6/2010
(Continued)

OTHER PUBLICATIONS

European Patent Office, International Search Report and Written Opinion in PCT Application No. PCT/DK2016/050449, dated Mar. 30, 2017.
(Continued)

*Primary Examiner* — Justin D Seabe
*Assistant Examiner* — Christopher R Legendre
(74) *Attorney, Agent, or Firm* — Wood Herron & Evans LLP

(57) ABSTRACT

A rotor hub for a wind turbine includes a hub frame having a blade attachment site configured for attachment of a wind turbine blade to the hub frame, and a dispenser coupled to the hub frame and containing one or more fasteners, wherein the one or more fasteners is selectively releasable from the dispenser to facilitate attachment of the wind turbine blade to the hub frame. A plurality of dispensers may be provided, each having a plurality of fasteners disposed therein. The dispensers may be coupled to the hub frame and distributed about the periphery of the blade attachment site. A method of attaching a blade to a rotor hub includes positioning the blade adjacent the attachment site on the hub frame, and
(Continued)

securing the blade to the hub frame at the attachment site using the fasteners from the dispensers.

31 Claims, 9 Drawing Sheets

(51) Int. Cl.
*F03D 80/70* (2016.01)
*F03D 7/02* (2006.01)

(52) U.S. Cl.
CPC .......... *F03D 80/70* (2016.05); *F05B 2240/50* (2013.01); *F05B 2240/912* (2013.01); *F05B 2260/301* (2013.01); *Y02E 10/721* (2013.01)

(56) References Cited

U.S. PATENT DOCUMENTS

| | | | |
|---|---|---|---|
| 2013/0236316 A1* | 9/2013 | Bitsch | F03D 1/0658 416/204 R |
| 2013/0302175 A1* | 11/2013 | Munk-Hansen | F03D 80/00 416/245 R |
| 2014/0377072 A1 | 12/2014 | Moore et al. | |
| 2018/0372064 A1* | 12/2018 | Joensen | F03D 80/70 |

FOREIGN PATENT DOCUMENTS

| | | |
|---|---|---|
| EP | 2662559 A1 | 11/2013 |
| EP | 2674611 A2 | 12/2013 |
| GB | 2493979 A | 2/2013 |
| JP | S4634259 Y1 | 11/1971 |
| JP | 2012087640 A | 5/2012 |
| JP | 2015151961 A | 8/2015 |
| JP | 2015222016 A | 12/2015 |
| KR | 20140012409 A | 2/2014 |
| WO | 2012034564 A1 | 3/2012 |
| WO | 2014206482 A1 | 12/2014 |

OTHER PUBLICATIONS

Danish Patent and Trademark Office, Search and Examination Report in PA 2015 70861, dated Jul. 20, 2016.
China National Intellectual Property Administration, First Notification of Office Action in CN Application No. 201680082288.9, dated Jul. 1, 2019.
Korean Intellectual Property Office, Notice of Non-Final Rejection in KR Application No. 10-2018-7021145, dated Aug. 20, 2019.
Japanese Patent Office, Notice of Reasons for Refusal in JP Application No. 2018-533049, dated Sep. 3, 2019.

* cited by examiner

ROTOR HUB FOR A WIND TURBINE HAVING PRE-POSITIONED FASTENERS AND RELATED METHOD

TECHNICAL FIELD

The invention relates generally to wind turbines, and more particularly to a wind turbine rotor hub having a dispenser containing a plurality of fasteners that facilitate coupling a wind turbine rotor blade to the rotor hub, and an improved method of coupling the wind turbine blade to the rotor hub using the fasteners in the dispenser.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a main shaft extending from the nacelle, which shaft is either directly or indirectly operatively coupled with a generator which is housed inside the nacelle. Consequently, as wind forces the blades to rotate, electrical energy is produced by the generator.

In a typical assembly process of a wind turbine, the tower is constructed and the nacelle is positioned on top of the tower at a significant height off of the ground level or sea level, as the case may be. The rotor hub may be coupled to the main shaft of the nacelle prior to placement of the nacelle atop the tower. Alternatively, the rotor hub may be coupled to the main shaft after the nacelle is placed atop the tower. In either case, at least one of the wind turbine blades, and in many cases all of the wind turbine blades, are usually coupled to the rotor hub in a separate assembly step after the rotor hub is positioned on the main shaft atop of the tower.

In such an assembly step, the root end of the wind turbine blade will generally be fitted with a plurality of connectors, which may take the form of stud bolts, about its circumference which extend longitudinally from the root end of the blade. The blade will then be lifted, typically with a crane system or the like, up to the top of the tower for attachment to the rotor hub. In this regard, the stud bolts at the root end of the blade will be generally aligned with corresponding through bores in the rotor hub and inserted therethrough. Once the stud bolts are positioned through the bores, a technician positioned in the interior of the rotor hub will secure fasteners to the ends of the stud bolts and thereby attach the wind turbine blade to the rotor hub.

Many modern wind turbines are pitch controlled and therefore provide for rotation of the wind turbine blade relative to the rotor hub about the blades longitudinal axis. The ability to pitch the blade is achieved through a pitch system having a pitch bearing at the interface between the blade and the rotor hub. In this regard, the pitch bearing includes an inner ring and an outer ring with a plurality of bearing elements (e.g., ball bearings) disposed between that allows the rings to rotate relative to each other. In many conventional wind turbine designs, the wind turbine blade is coupled to the inner ring of the pitch bearing and the outer ring of the pitch bearing is fixedly secured to the rotor hub. The pitch system further includes an actuator of one type of another that when actuated, rotates the blade about its longitudinal axis relative to the rotor hub.

When the pitch bearing is coupled to the rotor hub, the inner ring is typically accessible from an interior of the hub. The outer ring, however, is typically not accessible from the interior of the hub, but is instead accessible from an exterior of the hub. In such an arrangement, the pitch bearing, and more particularly the outer ring of the pitch bearing, may be coupled to the rotor hub while the hub is on the ground, deck of a ship, etc. and prior to the rotor hub being positioned atop the tower. For example, the pitch bearing may be coupled to the rotor hub at the manufacturing site such that the pitch bearing essentially forms part of the rotor hub. As can be appreciated, access to the hub and pitch bearing and coupling of the components are considerably simplified with the hub on the ground, deck of the ship, etc. It remains, however, that at least one of the wind turbine blades is coupled to the rotor hub when the hub is positioned atop of the tower at a significant height above ground level or sea level, as explained above.

In this regard, the connectors (e.g., stud bolts) extending from the root end of the wind turbine blade are inserted through bores in the inner ring of the pitch bearing. In current designs and as noted above, the inner ring of the pitch bearing is accessible from an interior of the rotor hub. Accordingly, a technician positioned within the interior of the rotor hub may secure fasteners to the connectors in order to attach the blade to the hub. To this end, the fasteners may be threaded nuts configured to cooperate with a threaded end of the stud bolts. The fasteners (e.g., nuts) may be fairly sizable and weigh anywhere between about 100 g and 500 g apiece, typically in the region of about 400 g apiece for a large wind turbine blade, such as a 60 m-80 m blade or larger. In a typical procedure, a container (e.g., box, bag, etc.) of nuts may be transported up through the wind turbine tower to the nacelle and located within or adjacent the hub. The technician may grab one or possibly a few nuts at a time and threadably engage the nuts with the stud bolts in a conventional manner. The technician may then easily access the container for additional nuts, since the technician and container are in close proximity to each other inside the hub, until all of the stud bolts have been fastened.

In recent years, there has been a significant increase in the overall size of wind turbines due to the desire to capture more of the wind's available energy. As the rotor hub, typically a casted component, has increased in size, the corresponding increase in material costs has presented a significant concern for wind turbine manufacturers. To address this concern, more recent wind turbine designs provide the inner ring of the pitch bearing coupled to the rotor hub and the wind turbine blade coupled to the outer ring of the pitch bearing (i.e., opposite to conventional designs discussed above). While such a design is effective for reducing material costs in manufacturing rotor hubs, this design change has presented other challenges for manufacturers. For example, with the wind turbine blade now coupled to the outer ring, the outer ring would not be accessible from the interior of the rotor hub. Hence, the technician must now be positioned at an external location where he/she can access the threaded ends of the stud bolts and apply a fastener thereto.

Modern rotor hubs typically consist of an inner hub frame that provides the structural aspects of the rotor hub and to which the pitch bearing and the rotor blades attach, and an outer cover, typically referred to as a spinner, which generally encloses the hub frame. The spinner generally protects the hub frame and related components, and provides a more aesthetic and aerodynamic configuration to the rotor at a central region of the rotor. Thus to access the outer ring of the pitch bearing, a technician will typically position himself/herself in the relatively confined space between the hub frame and the spinner. In this regard, the technician will grab one or a few of the relatively heavy fasteners, such as nuts (e.g., a pocket or pouch full) and then, via an access hole in the hub frame, position himself/herself outside the hub frame in the space between the hub frame and spinner in order to secure the nuts to the threaded stud bolts. When the technician depletes the limited supply of nuts on his/her person, the technician will exit the space between the hub frame and spinner, enter back into the interior of the hub (i.e., the interior of the hub frame), resupply himself/herself with another batch of nuts, and then climb back out into the space between the hub frame and spinner to continue securing nuts to the stud bolts. This process will then be repeated until all of the stud bolts, which may number as many as 180-200 bolts for current blade designs, have been secured with a nut.

Based on the above, it is clear that connecting the wind turbine blade to the outer ring of the pitch bearing has some drawbacks. Namely, securing fasteners to the connectors so as to couple the blade to the rotor hub is a difficult, labor intensive, and time-consuming process which increase costs. Additionally, it may not be uncommon for some of the fasteners to become unintentionally separated from the technician. For example, some fasteners may be dropped by the technician as he/she attempts to secure the fasteners to the connectors. Alternatively, fasteners may fall out of the technician's pocket or pouch and fall into the space between the hub frame and spinner. Such errant fasteners can cause damage and in any case must be removed before operation and are not easily retrieved from within that space.

Accordingly, there is a need for improved devices and procedures for coupling a wind turbine blade to a rotor hub that overcomes the drawbacks in current procedures for assembly of wind turbines.

SUMMARY

In accordance with aspects of the invention, a rotor hub for a wind turbine includes a hub frame having at least one blade attachment site configured for attachment of a wind turbine blade to the hub frame, and a dispenser coupled to the hub frame and containing one or more fasteners, wherein the one or more fasteners is selectively releasable from the dispenser to facilitate attachment of the wind turbine blade to the hub frame. The fasteners may take the form of threaded nuts.

In an exemplary embodiment, the hub frame includes a pitch bearing at the at least one attachment site, wherein the wind turbine blade is configured to be attached to the pitch bearing. The pitch bearing may include an inner and outer ring rotatable relative to each other, wherein the inner ring is coupled to the hub frame and the wind turbine blade is configured to be coupled to the outer ring of the pitch bearing. In one embodiment, the rotor hub may further include a spinner covering at least a portion of the hub frame, wherein, the outer ring of the pitch bearing is disposed in a space between an exterior of the hub frame and the spinner.

In an exemplary embodiment, the rotor hub includes a plurality of dispensers, wherein each dispenser includes a plurality of fasteners. The dispensers are coupled to the hub frame and distributed about the periphery of the blade attachment site. For example, the dispensers may be coupled to the outer ring of the pitch bearing. In one embodiment, a dispenser includes an elongate hollow body having a first end, a second end, and an interior passage between the first and second end. The plurality of fasteners is positioned in the interior passage. The dispenser further includes at least one tab at the first and/or second end of the elongate hollow body to prevent movement of a fastener out of the dispenser through the first and/or second end, and at least one connecting flange for coupling the dispenser to the hub frame.

The dispensers may have a two-part construction including a base member and an insert. The base member includes an elongate body having a first end, a second end, and an open channel between the first and second ends. The insert includes an elongate hollow body having a first end, a second end, and an interior passage between the first and second ends, wherein the plurality of fasteners is positioned within the interior passage. The insert is then inserted into the open channel of the base member to thereby form the dispenser. This may be through a snap fit using the walls of the base member. In the two-part construction, the at least one tab and the at least one connecting flange may be included with the base member. In one embodiment, the at least one tab and the at least one connecting flange may be integrally formed with the base member. The base member and the insert may be formed from different materials. For example, the hardness of the material from which the base member is formed may be greater than the hardness of the material from which the insert is formed. In one embodiment, the base member may be formed from a metal and the insert may be formed from a rubber material.

The dispenser, in an exemplary embodiment, includes a removable portion that provides access to and selective removal of the fasteners in the dispenser when the removable portion is removed. In this regard, the elongate hollow body may include a pair of tear lines that facilitate separation of the removable portion from the elongate body. When the dispenser is presented as a two-part construction, the tear lines are formed in the insert and spaced from the free ends of the walls of the base member that form the open channel. When the removable portion is removed, the elongate hollow body defines a pair of spring fingers. The spring fingers are configured to flex so as to allow a selected fastener to be removed from the dispenser while retaining any remaining fasteners within the dispenser.

In another embodiment, a wind turbine construction includes a tower and a rotor hub positioned atop of the tower. The rotor hub includes a hub frame having at least one blade attachment site where a wind turbine blade is configured to be attached to the hub frame, and a dispenser coupled to the hub frame and containing one or more fasteners, wherein the one or more fasteners is selectively releasable from the dispenser to facilitate attachment of the wind turbine blade to the hub frame.

In still a further embodiment, a method of attaching at least one wind turbine blade to a wind turbine rotor hub includes providing a wind turbine hub frame having at least one blade attachment site for attachment of the at least one wind turbine blade; providing a dispenser coupled to the hub frame and containing one or more fasteners; positioning the at least one wind turbine blade adjacent the at least one blade attachment site of the hub frame; and securing the at least one wind turbine blade to the hub frame at the at least one blade attachment site using the one or more fasteners from the dispenser.

In one embodiment of the method, providing a wind turbine hub frame includes erecting a wind turbine tower at a wind turbine installation site, and coupling the hub frame atop of the tower, wherein the coupling of the hub frame to the top of the tower precedes securing the at least one wind turbine blade to the hub frame. Additionally, a plurality of dispensers may be provided, wherein each dispenser includes a plurality of fasteners. The dispensers may be coupled to the hub frame and be distributed about the periphery of the blade attachment site. The plurality of dispensers may be coupled to the hub frame prior to the coupling of the hub frame atop the tower. For example, the dispensers may be coupled to the hub frame at a manufacturing site for the hub frame.

The method may further include removing a portion of the dispenser to provide access to the plurality of fasteners in the dispenser and provide selective removal of the fasteners therefrom. For example, in one embodiment a portion of the dispenser between a pair of tear lines may be torn away to expose the fasteners in the dispenser. Upon removal of the portion, the method further includes flexing a pair of spring arms to remove a selected fastener from the dispenser, wherein the spring arms retain any remaining fasteners within the dispenser.

In a further aspect of the inventive method, securing the at least one wind turbine blade to the hub frame further comprises securing at least one wind turbine blade to a pitch bearing on the hub frame. More particularly, the method may include securing the at least one wind turbine blade an outer ring of the pitch bearing. The outer ring may be positioned external of the hub frame such that the at least one wind turbine blade is coupled to the outer ring of the pitch bearing from a space between an exterior of the hub frame and a spinner of the rotor hub. The plurality of fasteners may include threaded nuts and securing the at least one wind turbine blade to the hub frame may include tightening the threaded nuts to a threaded end of a connector, such as a stud bolt, extending from the at least one wind turbine blade.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
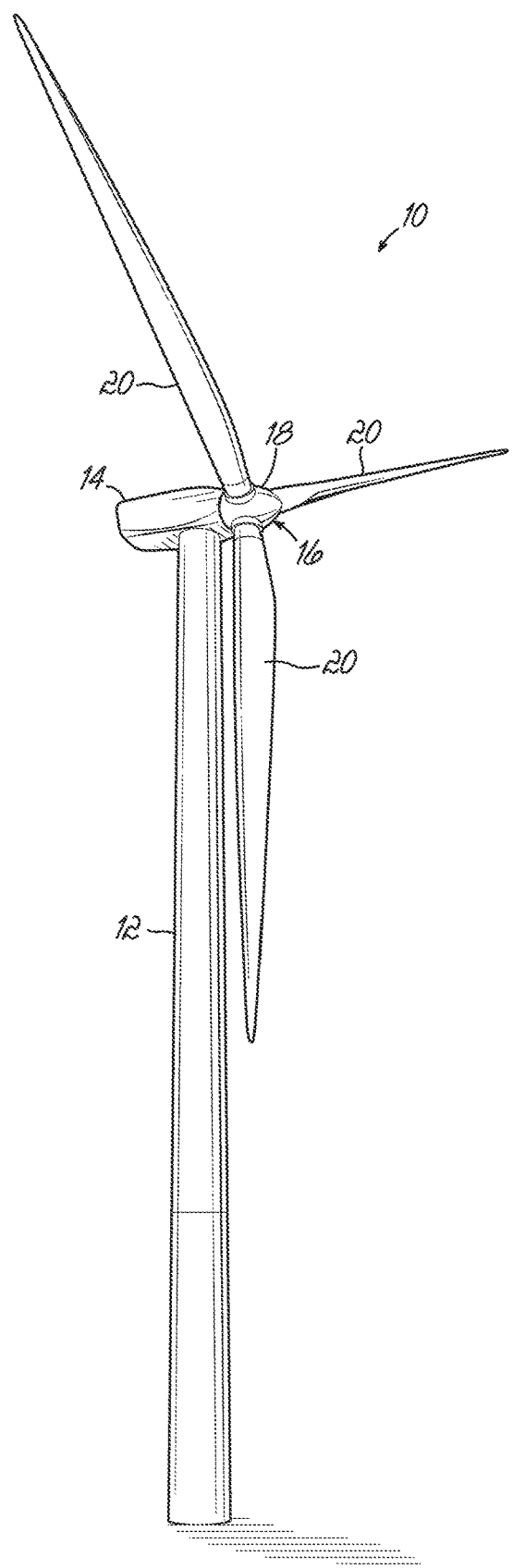
FIG. 1 is a perspective view of a wind turbine in accordance with an aspect of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
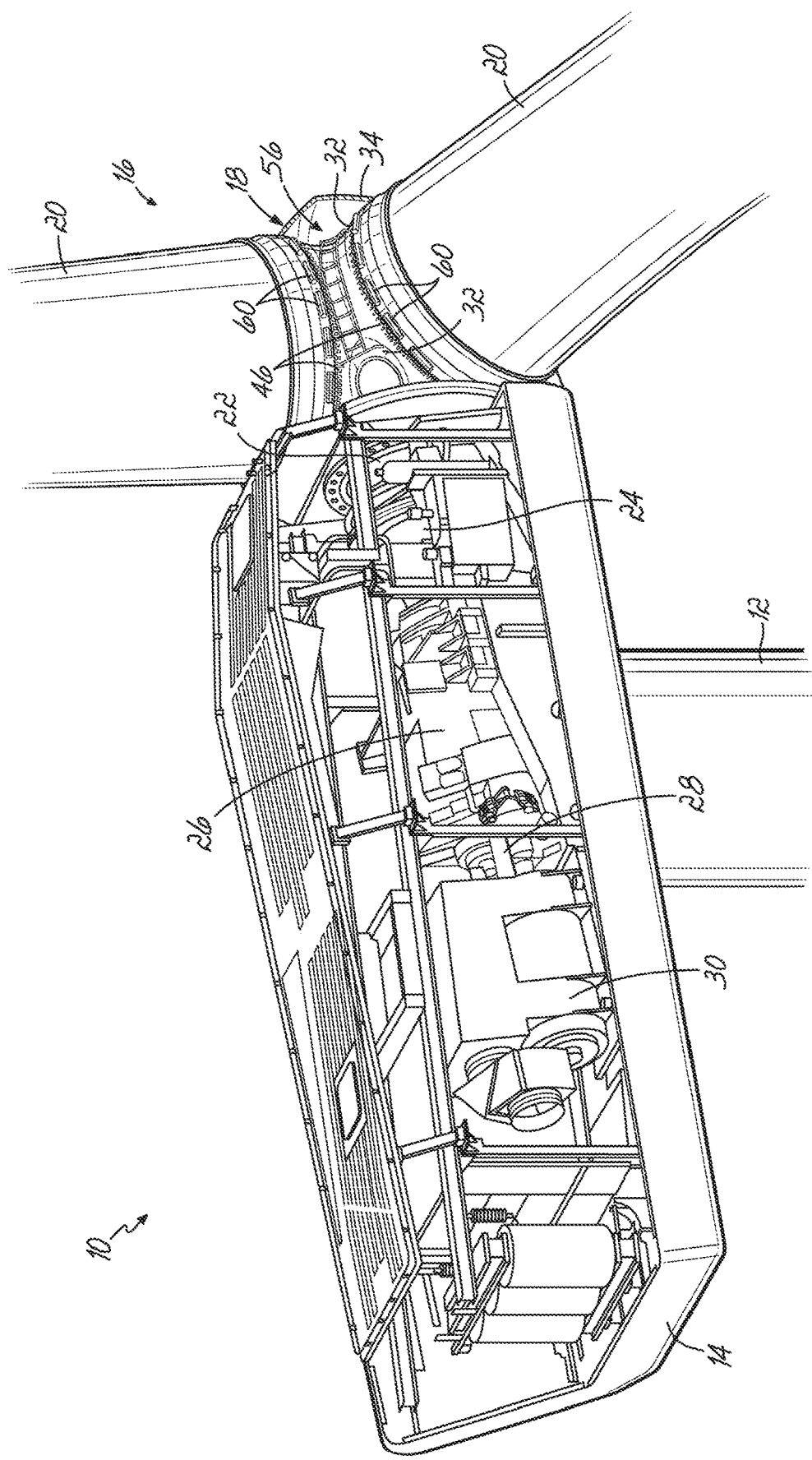
FIG. 2 is a partial perspective view of a wind turbine nacelle and rotor according to an embodiment of the invention.

As illustrated in FIG. 2, the nacelle 14 includes a main shaft 22 that is supported in the nacelle 14 by a main bearing 24. The main shaft 22 is operatively coupled to a gear box 26 that through various gearing stages generally increases the angular velocity of a secondary shaft 28. The secondary shaft 28 is, in turn, operatively coupled to a generator 30 configured to produce electricity. The main shaft 22 extends from a front side of the nacelle 14 and the rotor 16 is mounted to the main shaft 22 such that rotation of the rotor 16 results in a corresponding rotation of the main shaft 22. As noted above, the rotor 16 includes a hub 18 and one or more blades 20. The hub 18 includes an inner hub frame 32 and an outer cover or spinner 34. Similar to the above, the hub frame 32 provides the structural aspects of the rotor hub 18 and to which the rotor blades 20 attach, and the spinner 34 generally protects the hub frame 32 and related components and provides a more aesthetic and aerodynamic configuration to the rotor 16.

Figure 3:
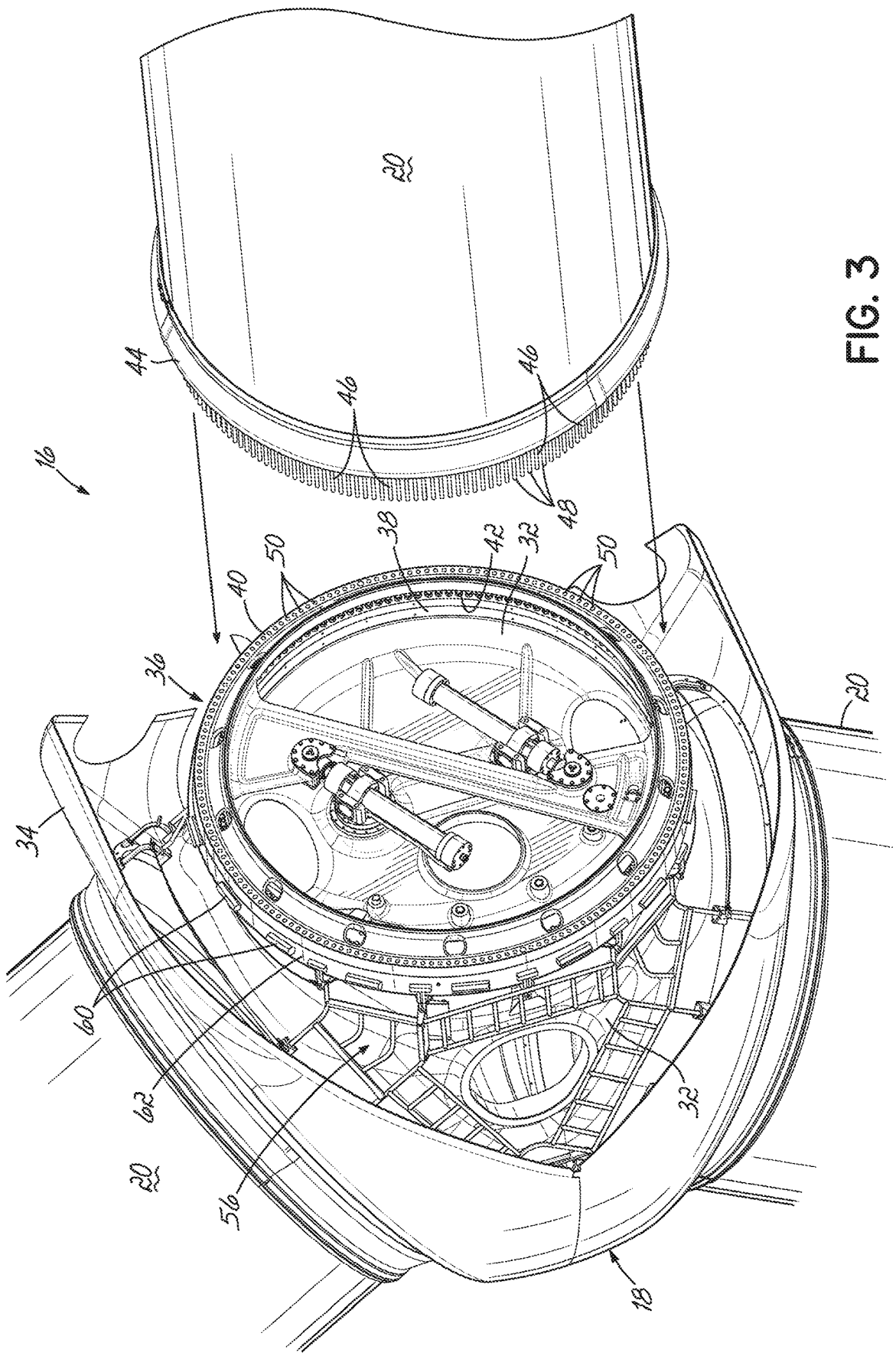
FIG. 3 is a partial perspective view of a wind turbine rotor in accordance with an embodiment of the invention.

Each of the blades 20 couple to the hub frame 32 at a blade installation site on the hub frame. In one embodiment, the blade installation site on the hub frame 32 may include a pitch bearing 36 in order to allow the blades 20 to pitch or rotate about their longitudinal axis. As illustrated in FIG. 3, the pitch bearing 36 generally includes an inner ring 38, an outer ring 40, and a plurality of roller elements, such as ball bearings or the like (not shown), disposed between the inner and outer rings 38, 40 so as to allow rotation of the rings relative to each other. One of the rings is coupled to the hub frame 32 and the other ring is coupled to one of the blades 20. As noted above, as blades have increased in size, certain advantages may be gained by having the blade couple to the outer ring of the pitch bearing. Thus in an exemplary embodiment, the pitch bearing 36 may be configured such that the blade 20 is coupled to the outer ring 40 while the inner ring 38 is coupled to the hub frame 32. The invention is not limited to this arrangement, however, and in an alternate embodiment, the pitch bearing may be configured such that the blade couples to the inner ring while the outer ring is coupled to the hub frame (not shown). As will be appreciated from the below, aspects of the invention will be beneficial in either arrangement. Moreover, in a further alternative embodiment, a blade may be coupled to the hub frame without a pitch bearing.

The pitch bearing 36 is typically coupled to the hub frame 32 prior to the hub 18 being positioned atop the tower 12. By way of example, the pitch bearing 36 may be coupled to the hub frame 32 at a manufacturing facility for the hub 18 or other location on the ground, deck of a ship or other location where it is easier from an assembly standpoint to couple the pitch bearing 36 to the hub frame 32. In this regard, the inner ring 38 includes a plurality of bores (not shown) disposed about the circumference of the inner ring 38 and extending therethrough. The hub frame 32 similarly includes a plurality of bores (not shown), which may or may not be threaded. To couple the pitch bearing 36 to the hub frame 32, respective bores in the inner ring 38 and the hub frame 32 are aligned, connectors are inserted through the bores, and fasteners are engaged with the connectors to secure the pitch bearing 36 to the hub frame 32. By way of example, head bolts may be inserted through the aligned bores and a threaded nut engaged to the head bolts to secure the pitch bearing 36 to the hub frame 32. Such a coupling is generally shown at 42 in FIG. 3. In this way, the inner ring 38 remains fixed relative to the hub frame 32, but the outer ring 40 is capable of rotating relative to the hub frame 32 about a central axis of the pitch bearing 36. Although the coupling of the pitch bearing 36 to the hub frame 32 was described above using head bolt/nut fasteners, other types of fasteners may also be used and remain within the scope of the present invention.

Unlike the coupling of the pitch bearing 36 to the hub frame 32, during assembly of a wind turbine 10 at an installation site, one or more of the blades 20 are coupled to the rotor hub 18 once the rotor hub 18 is positioned atop the tower 12 and coupled to the main shaft 22. In this regard and as illustrated in FIG. 3, a blade 20 is raised, by a crane system or the like (not shown), for example, such that a root end 44 of the blade 20 is brought into close proximity to the pitch bearing 36. The root end 44 of the blade 20 includes a plurality of connectors 46 circumferentially spaced along the root end 44 and longitudinally extending therefrom. In an exemplary embodiment, the connectors 46 may be configured as stud bolts having a first end coupled to the root end 44 of the blade 20 and a second threaded end 48. The number of connectors 46 may depend on the size of the blade 20 as well as other factors, and may number between about 80 and 200 connectors (e.g., stud bolts) in exemplary embodiments. More or fewer connectors are also possible in alternative embodiments and the invention should not be limited to this range of connectors.

The outer ring 40 includes a plurality of bores 50 disposed about the circumference of the outer ring 38 wherein each bore 50 is configured to receive a connector 46 therethrough. To couple the blade 20 to the outer ring 40, the connectors 46 are generally aligned with the bores 50 and the blade 20 is moved such that the connectors 46 extend through the bores 50. When so positioned, the threaded end 48 of the connectors 46 may be exposed (e.g., beneath the outer ring). Fasteners 52, such as threaded nuts, may then engage with the connectors 46 to secure the blade 20 to the hub frame 32. In this regard, for example, a technician typically manually places a nut on a respective stud bolt and sufficiently tightens the nut in a manner generally known to those or ordinary skill in the art to achieve the coupling.

As noted above and as best illustrated in FIGS. 2 and 3, when the pitch bearing 36 is coupled to the hub frame 32, the outer ring 40, and more particularly, the bores 50 in the outer ring 40 are positioned on an exterior side of the hub frame 32 and generally in the space 56 between the exterior of the hub frame 32 and the spinner 34. Accordingly, to secure the blade 20 to the hub frame 32, the technician will have to position himself/herself in this space 56 in order to place the fasteners 52 on the connectors 46 (e.g., on the threaded ends of the stud bolts) and tighten the fasteners to facilitate the coupling. As noted above, this creates a number of logistical concerns and drawbacks.

To address these drawbacks, and in accordance with an aspect of the present invention, the fasteners 52 for the connectors 46 may be coupled to the hub 18 and distributed about a periphery of the blade installation site on the hub frame 32. By way of example, the fasteners 52 may be coupled to and distributed about the circumference of the pitch bearing 36 so that the technician does not have to carry a group of fasteners (e.g., a bag full or pocket full) within the limited space 56 between the hub frame 32 and the spinner 34, or repeatedly go back into the interior of the hub to obtain additional fasteners. To the contrary, in accordance with the invention, the fasteners 52 are pre-positioned on the hub frame 32 adjacent the connectors 46 to which the fasteners are to be attached once the connectors have been inserted through their respective bores. In an exemplary embodiment, the connectors 46 may be coupled to the outer ring 40 of the pitch bearing 32 and distributed about its circumference.

To this end, one or more fasteners 52 may be securely, but yet removably or releasably contained within a dispenser 60 which is securely coupled to the hub frame 32, in particular at a location convenient for the technician securing the fasteners 52 to the connectors 46. In an exemplary embodiment, for example, the dispenser 60 may take the form of an elongate sleeve (e.g., such as a nut sleeve) configured to contain the one or more fasteners 52. This arrangement ensures that the fasteners 52 do not accidentally or unintentionally become separated from the dispenser 60, but yet selectively allow access to the fasteners 52 so that a technician may secure a selected fastener (e.g., a nut) to the connector 46 (e.g., the threaded end of a stud bolt). A plurality of dispensers 60 may then be coupled to the outer ring 40 adjacent the bores 50 and distributed about the circumference of the outer ring 40. In an exemplary embodiment, the plurality of dispensers 60 are coupled to an outer side wall 62 of the outer ring 40 and are substantially uniformly spaced about its circumference. It should be recognized, however, that in alternative embodiments the dispensers 60 may be coupled to the outer ring 40 at other locations. Additionally, the dispensers may be non-uniformly spaced about the circumference of the outer ring 40.

In accordance with an exemplary embodiment, a dispenser 60 includes an elongate hollow body 64 having a first end 66 and a second opposed end 68. The elongate hollow body 64 defines an interior space or passage 70 configured to receive the fasteners 52 and which extends along a central axis 72. The length of the hollow body 64 depends, for example, on how many fasteners 52 are to be contained in the dispenser 60. By way of example, the dispenser 60 may be configured to hold between about 5-20 fasteners, and preferably holds about 10 fasteners, 15 fasteners or 20 fasteners. The dispenser 60 may be configured to hold more or less fasteners 52 in alternative embodiments of the invention. In an exemplary embodiment, the hollow body 64 may be generally straight (as the length of the dispenser is small compared to the radius of curvature of the outer ring 40). However, in alternative embodiments, the hollow body 64 may be slightly curved to match the curvature of the outer ring 40, or location at which the dispenser 60 is attached to the hub 18.

The elongate body 64 may have a cross-sectional shape configured to correspond with the cross-sectional shape of the fastener 52. Thus, for example, in one embodiment the elongate body 64 may have a hexagonal cross-sectional shape configured to contain hexagonally shaped fasteners (e.g., hexagonal nuts). Other cross-sectional shapes, however, are also possible and within the scope of the present invention. In this regard, octagonal or other regular or irregular polygonal shapes are possible. Additionally, the interior passage 70 may be configured to be just slightly larger than the size of the fasteners 52 configured to be contained therein. In this way, for example, the fasteners 52 are generally not able to move in any direction other than in a direction generally parallel to the central axis 72. To restrict motion of the fasteners 52 in a direction generally parallel to the central axis 72, the first and/or second ends 66, 68 may include one or more tabs 74 which project generally radially inward such that the tabs 74 generally block egress of a fastener 52 out of the first or second end of the dispenser 60.

Figure 5A:
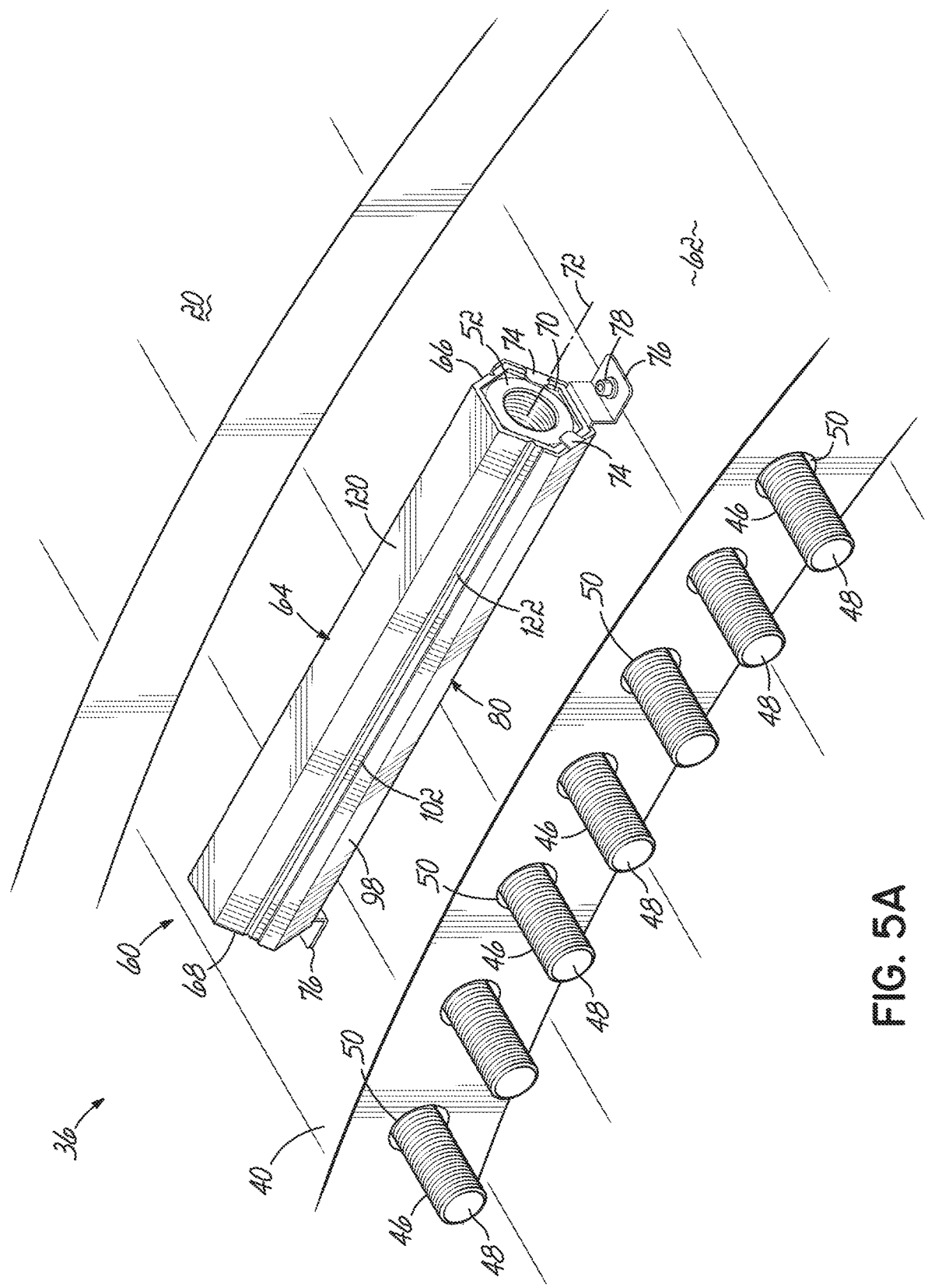
FIG. 5A is a partial perspective view of a fastener housing for coupling a blade to a rotor hub according to an embodiment of the invention.

The dispenser 60 further includes one or more connectors for securing the dispenser 60 to the outer ring 40 of the pitch bearing 36. In an exemplary embodiment, the dispenser 60 may include two connecting flanges 76 for coupling the dispenser 60 to, for example, the outer side wall 62 of the outer ring 40. In this regard and as illustrated in FIG. 5A, one connecting flange 76 may be located adjacent the first end 66 of the dispenser 60 and a second connecting flange 76 may be located adjacent the second end 68 of the dispenser 60. Other positions for the connecting flanges 76 are also possible and the invention should not be limited to that shown in the figures. One end of the connecting flange 76 is coupled to the elongate body 64 and the other end of the connecting flange is coupled to the outer ring 40, such as with a suitable fastener 78, which may be a screw or the like.

Figure 4:
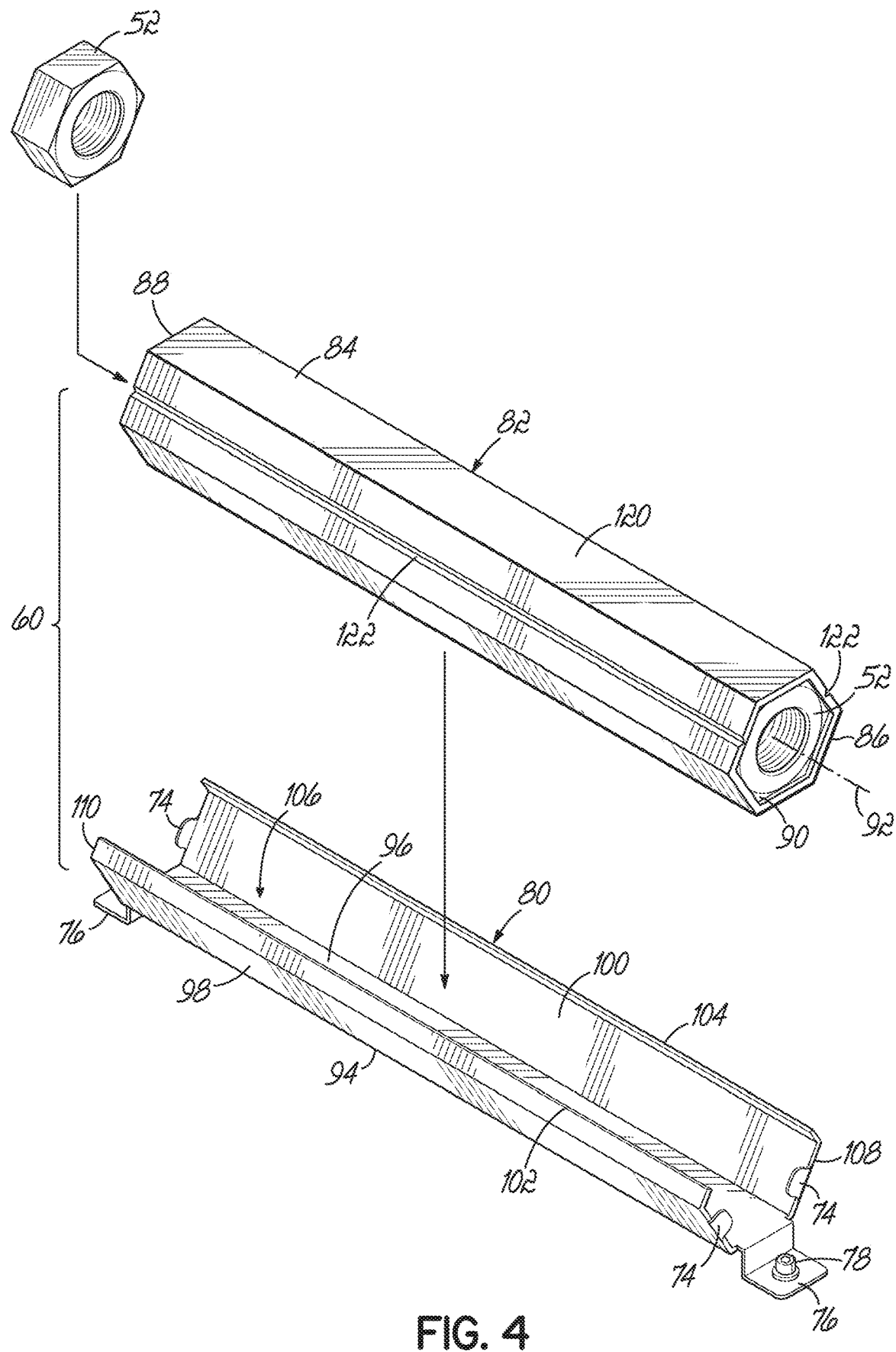
FIG. 4 is a disassembled perspective view of a fastener housing according to one embodiment of the invention.

In an exemplary embodiment and as best illustrated in FIG. 4, the dispenser 60 may have a two-part construction including a base member 80 and an insert 82 coupled to the base member 80. The insert 82 includes an elongate hollow body 84 having a first end 86 and a second opposed end 88. The elongate hollow body 84 defines an interior space or passage 90 configured to receive the fasteners 52 and which extends along a central axis 92. As explained above, the elongate body 84 may have a cross-sectional shape configured to correspond with the cross-sectional shape of the fasteners 52 and the interior passage 90 may be configured to be just slightly larger than the size of the fasteners 52. In an exemplary embodiment, at least one of the first or second ends 86, 88 of the elongate body 84 is open such that fasteners 52 may be loaded into the insert 82 from one or both ends. According to one embodiment, the insert 82 may be formed from an extruded polymeric material, such as rubber. Other materials, including a variety of thermoplastic or thermoset materials may alternatively be used.

The base member 80 includes an elongate body 94 having a base wall 96 and opposed side walls 98, 100 extending from the base wall 96 and terminating in free ends 102, 104. The base member 80 does not have a closed configuration, but rather has an open configuration such that the base wall 96 and side walls 98, 100 define an open channel 106. The base wall 96 and side walls 98, 100 have a shape that corresponds to at least a portion of the cross-sectional shape of the insert 82 (which in turn has a shape corresponding to the fasteners 52). In the exemplary embodiment, the base member 80 includes tabs 74 at the first and second ends 108, 110 of the elongate body 94. In the two-part construction, the tabs 74 not only operate to help retain the fasteners 52 within the insert 82, but may also operate to retain the insert 82 within the base member 80, as explained below.

In one embodiment, the base member 80 may be configured such that the tabs 74 are in a closed position, wherein the tabs extend radially inward to generally block ingress/egress across the first and second ends 108, 110 (as illustrated in FIG. 4). Alternatively, the base member 82 may be configured such that the tabs 74 are in an open position, wherein the tabs extend longitudinally such that the tabs do not block ingress/egress across the first and second ends 108, 110 (not shown). In this embodiment, however, the tabs 74 are generally movable to the closed position. In addition to the tabs 74, the base member 80 may also include the connecting flanges 76 for securing the dispenser to the outer ring 40 of the pitch bearing 36. By way of example, the connecting flanges 76 may extend from the base wall 96 adjacent both the first and second ends 108, 110 of the elongate body 94. It should be recognized that in one embodiment the tabs 74 and/or the connecting flanges 76 may be integrally formed with the elongate body 94. In alternative embodiments, however, the tabs 74 and/or the connecting flanges 76 may be separate elements which are coupled to the elongate body 94 of the base member 80.

The base member 80 may be configured to provide additional rigidity and strength to the dispenser 60. Accordingly, in an exemplary embodiment, the base member 80 may be formed from metal. More particularly, the base member 80 may be formed from aluminum or steel sheet metal, and thus be subject to various metalworking processes to achieve the desired shape. For example, the sheet metal may be worked to not only have the desired shape to the base wall 96 and side walls 98, 100, but also to shape the tabs 74 and the connecting flanges 76 as well. In an exemplary embodiment, the material hardness of the base member 80 may be greater than the material hardness of the insert 82. This allows the insert 82 to be designed to sufficiently grip or hold the fasteners 52, while the base member 80 may be designed to give sufficient strength to the dispenser 60.

As illustrated in FIG. 4, to assemble the two-part dispenser 60, once the fasteners 52 have been loaded into the insert 82, the insert 82 may be positioned into the channel 106 of the base member 80. This may be achieved in a number of ways, for example. In one embodiment, the side walls 98, 100 of the base member 80 may be flexed open so as to allow the insert 82 to slide into the channel 106 in a snap-fit manner. In such an embodiment, the tabs 74 may be formed in their closed positions such that the insert 82 may not be generally movable in a direction of the central axis 72 relative to the base member 80. The tabs 74 also help retain the fasteners 52 within the inert 82. In another embodiment, if the tabs 74 are in their open position, the insert 82 may be slid into the channel 106 through one of the first or second end 108, 111 of the base member 80. Once the insert 82 is in the channel 106, the tabs 74 may be moved, such as by bending, for example, to the closed position. In still another embodiment, the sheet metal that forms the base member 80 may be formed about a fastener-packed insert 82 during the formation process of the base member itself. In any event, once the insert 82 and base member 80 are coupled together, the dispenser 60 may be coupled to the pitch bearing 36 as described above.

While the dispenser 60 was described above as having a two-part construction, aspects of the invention are not limited to such an arrangement. By way of example, the dispenser 60 may be formed from a suitable material that allows for a unitary or monolithic construction. In such an embodiment, the dispenser would be similar to the insert 82, but include tabs 74 and connecting flanges 76 to help retain the fasteners within the sleeve and facilitate coupling of the dispenser to the pitch bearing 36, and the outer ring 40 thereof more particularly. Thus, the invention is not limited to the two-part construction described herein and a different construction, such as a monolithic or multi-part construction, is possible.

As illustrated in FIGS. 2 and 3, a plurality of dispensers 60 is distributed about the periphery of the blade attachment site, such as about the circumference of the outer ring 40. Of course, the number of dispensers 60 may be determined by the total number of fasteners 52 to be secured to the connectors 46. By way of example, anywhere between 10-20 dispensers 60 may be distributed about the outer ring 40 of the pitch bearing 36. More particularly, 10 dispensers, 15 dispensers or 20 dispensers may be distributed about the outer ring 40 of the pitch bearing 36. In an advantageous aspect of the invention, the plurality of dispensers 60 may be coupled to the hub 18 prior to the hub 18 being positioned atop the tower 12. By way of example, the dispensers 60 may be coupled to the outer ring 40 of the pitch bearing 36, which may, in turn, be pre-assembled to the hub frame 32 at the manufacturing site of the hub 18 or hub frame 32. In this way, the fasteners 52 are positioned atop the tower 12 with placement of the nacelle 14 on the occasion that the hub 18 is pre-assembled to the nacelle 14 prior to placement of the nacelle atop the tower 12, or with placement of the hub 18 on the main shaft 22 on the occasion that the nacelle 14 is positioned atop the tower 12 prior to the hub 18 being coupled to the main shaft 22. In either scenario, a technician does not need to transport the numerous and relatively heavy fasteners 52 up to the top of the tower 12.

In use, when the blade 20 is positioned adjacent the pitch bearing 36 and the connectors 46 are inserted through the bores 50 in the outer ring 40 of the pitch bearing 36, a technician may position himself/herself outside of the hub frame 32 and in the space 56 between the hub frame 32 and the spinner 34. As illustrated in FIGS. 5A-6C, to access the fasteners 52 and provide selective removal of the fasteners 52 therefrom, the technician may remove an upper portion 120 of a dispenser 60 to expose the fasteners 52. In this regard, the dispenser 60 may include a pair of grooves 122 (e.g., v-notch) in the hollow body 64. The grooves 122 operate as lines of weakness or tear lines that allow the upper portion 120 to be separated fairly easily. By way of example, in the two-part construction, the grooves 122 may be formed in the insert 82 and be positioned above the free ends 102, 104 of the side walls 98, 100 when the dispenser 60 is assembled, as illustrated in FIG. 6A. In any event, when access to the fasteners 52 is desired, the technician my take a utility knife or other suitable tool and make a cut along the grooves 122 so as to remove the upper portion 120. Alternatively, the grooves 122 may include an initiation slit at one of its ends that allows the technician to grasp the upper portion 120 and tear it from the dispenser 60 to expose the fasteners 52. The removal of the upper portion 120 is schematically illustrated in FIGS. 5B and 6B.

In an advantageous aspect, once the upper portion 120 has been removed, the fasteners 52 remain restrained from coming loose from the dispenser 60 but are selectively removable or releasable therefrom. In this regard, the free ends of the dispenser 60 operate as spring fingers 124, 126 to keep the fasteners 52 retained within the dispenser 60. In the two-part construction of the dispenser 60, the spring fingers 124, 126 may be formed from the free ends 102, 104 of the side walls 98, 100 of the base member 80 and/or the free ends 128, 130 of the insert 82. When a fastener 52 is to be removed from the dispenser 60, the technician will grab a selected fastener 52 and pull the fastener upwardly through an opening 132 in the dispenser 60 created by the removal of the upper portion 120. As the fastener 52 is pulled, the spring fingers 124, 126 flex outwardly or away from each other so as to release the fastener 52 from the dispenser 60. Once the fastener 52 has cleared the opening 32, the spring fingers 124, 126 snap back inwardly such that the remaining fasteners 52 in the dispenser 60 are retained therein and cannot become accidentally or unintentionally separated therefrom.

Figure 5B:
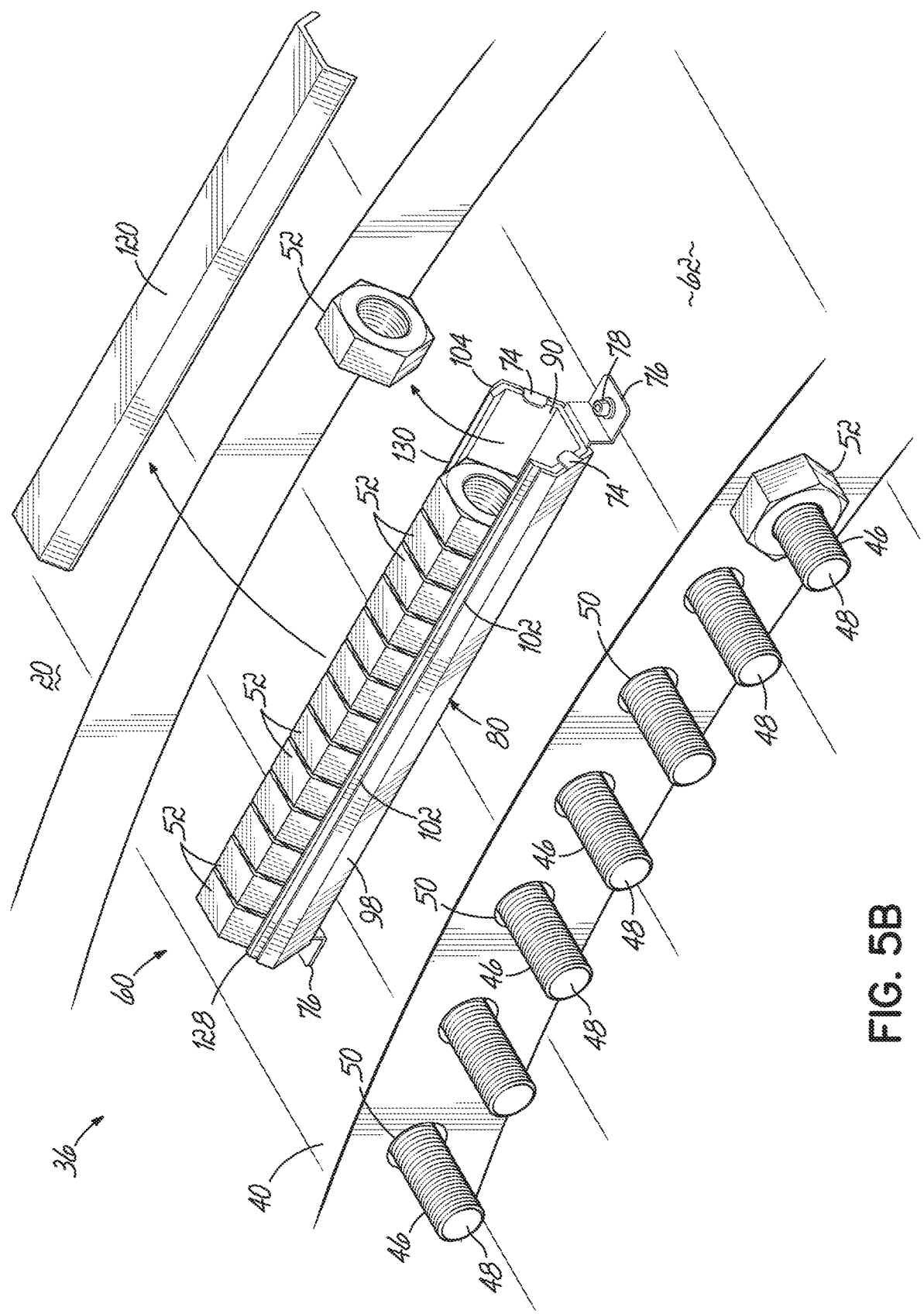
FIG. 5B is another partial perspective view of the fastener housing of FIG. 5A for coupling a blade to a rotor hub according to an embodiment of the invention.
Figure 5C:
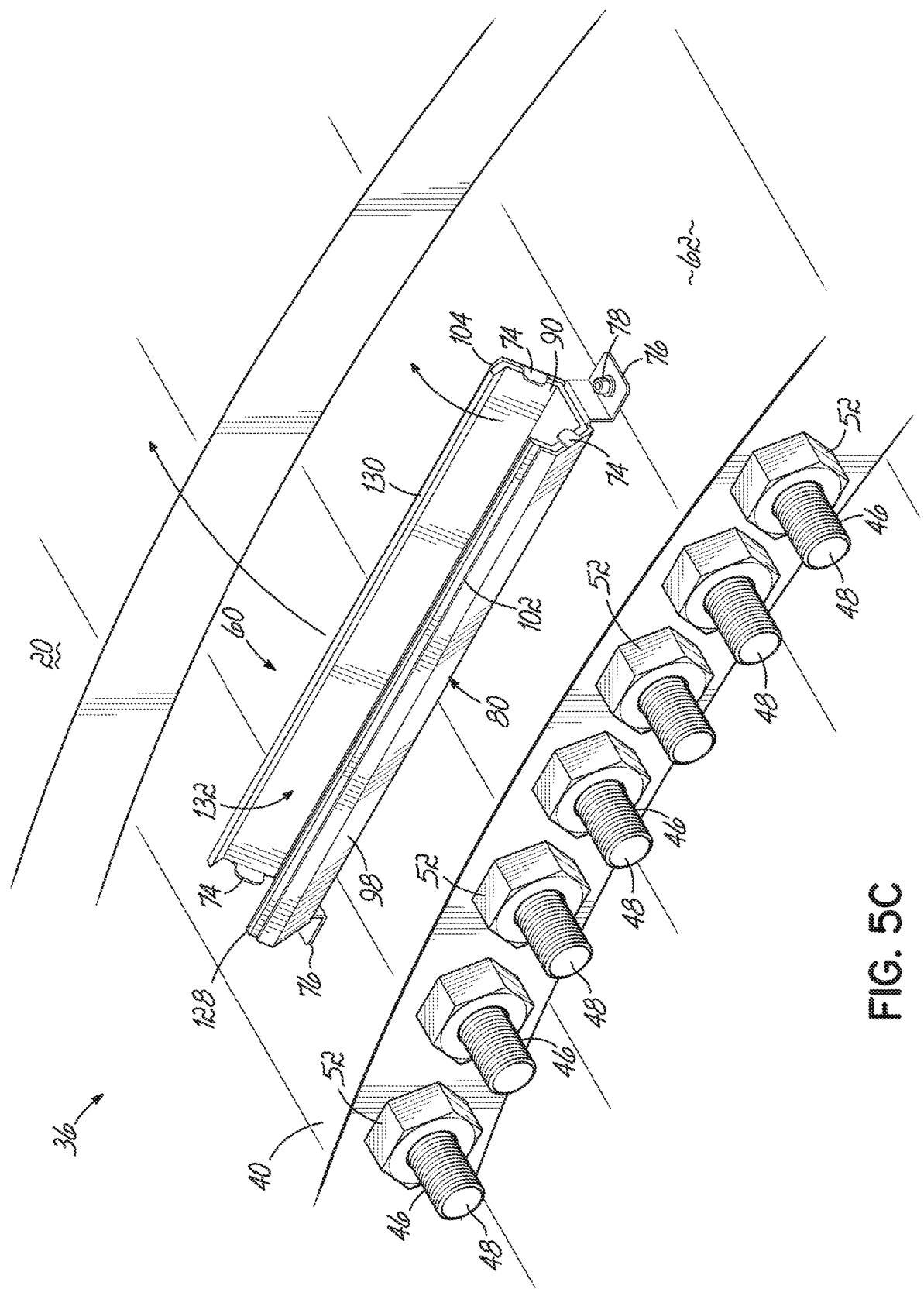
FIG. 5C is another partial perspective view of the fastener housing of FIG. 5A for coupling a blade to a rotor hub according to an embodiment of the invention.
Figure 6A:
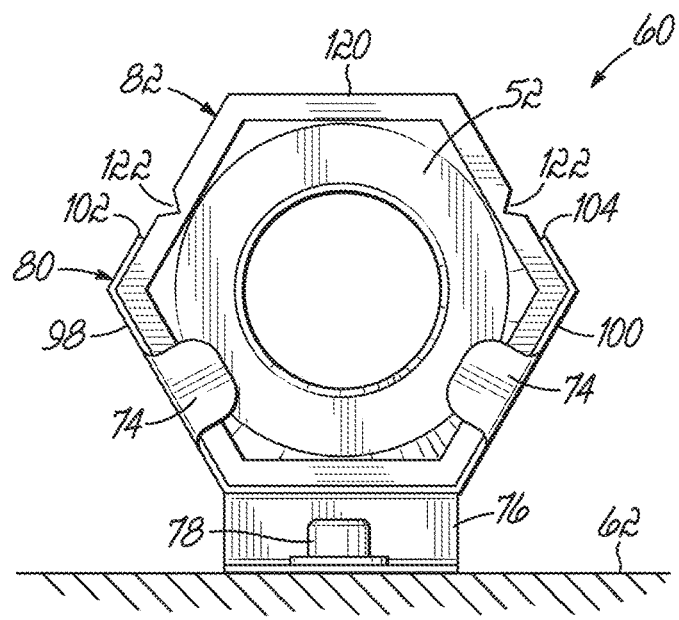
FIG. 6A is a partial end view of the fastener housing of FIG. 5A for coupling a blade to a rotor hub according to an embodiment of the invention.
Figure 6B:
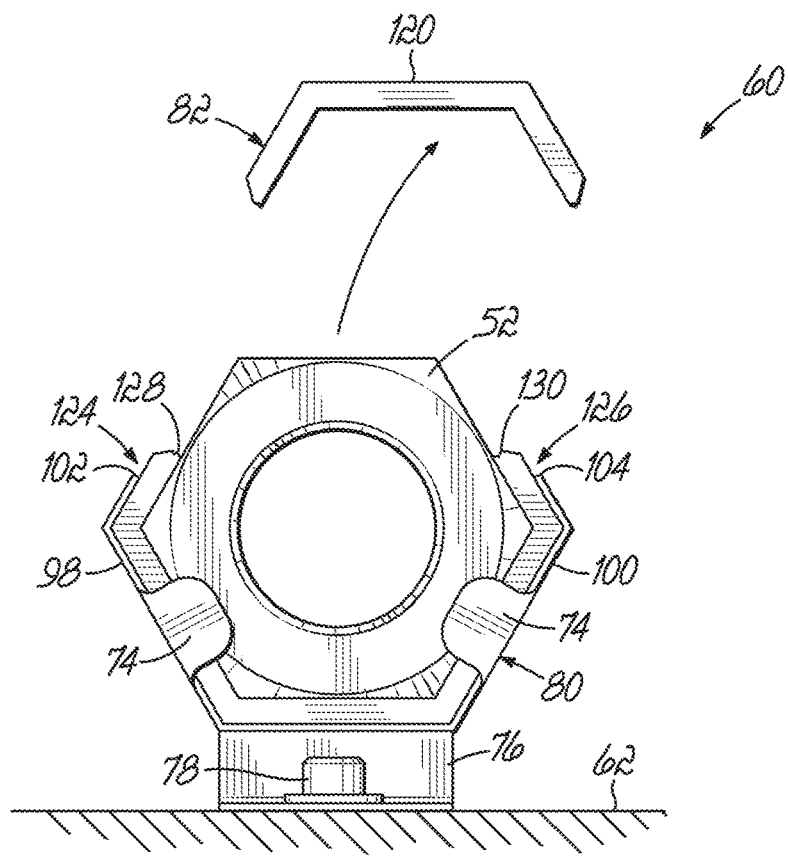
FIG. 6B is another partial end view of the fastener housing of FIG. 5A for coupling a blade to a rotor hub according to an embodiment of the invention.
Figure 6C:
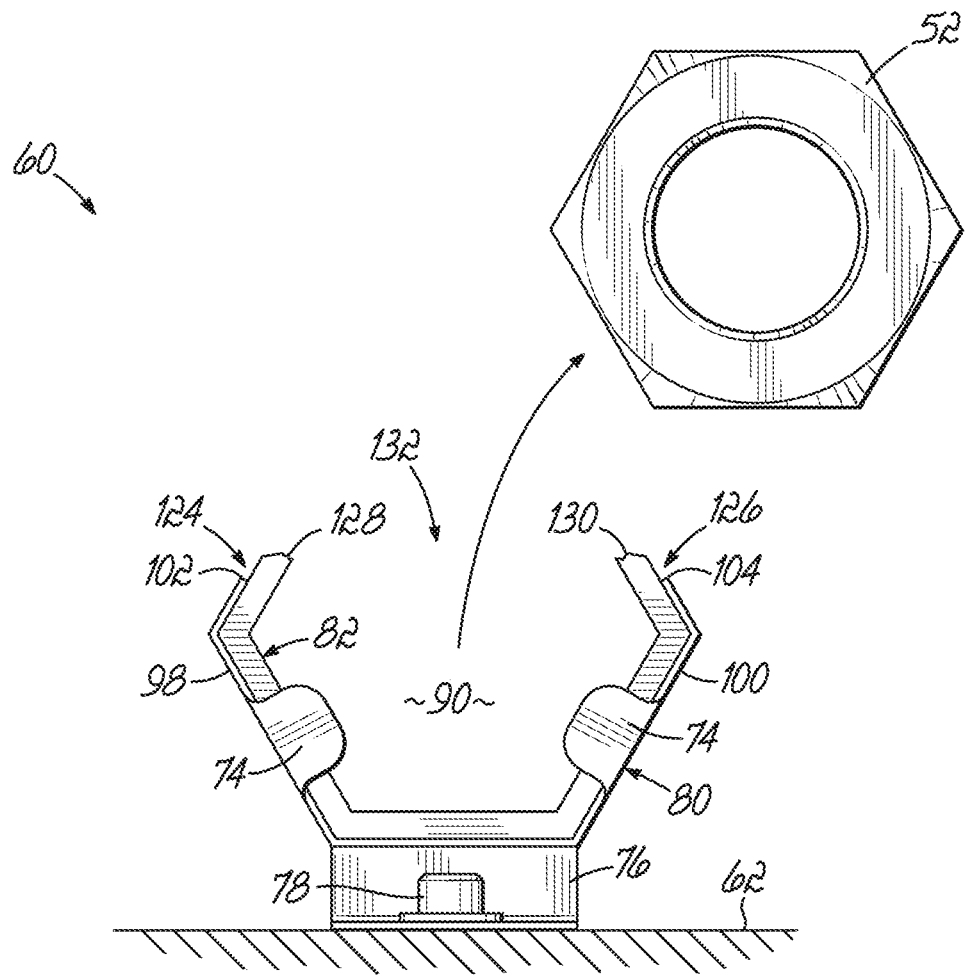
FIG. 6C is another partial end view of the fastener housing of FIG. 5A for coupling a blade to a rotor hub according to an embodiment of the invention.

The technician may then proceed with securing the fastener 52 on the connector 46, such as the threaded end 48 of a selected and adjacent stud bolt (FIG. 5B). Of course, this process may be repeated until all of the fasteners 52 in the dispenser 60 have been secured to a corresponding connector 46 (FIG. 5C). When a dispenser 60 has been emptied, the technician may move to another dispenser 60, remove an upper portion 120 thereof, and continue securing fasteners 52 onto the connectors 46. This may be repeated until all of the connectors 46 along the circumference of the pitch bearing 36 have been secured with a fastener 52. Once all of the connectors 46 have been secured with a fastener, and the blade 20 is coupled to the hub 18, and more particularly the hub frame 32, the technician may exit from the space 56 between the hub frame 32 and the spinner 34.

Distributing the fasteners 52 about the periphery of the blade installation site adjacent to where the fasteners are to be applied and using a plurality of dispensers 60 provides certain advantages. In this regard, the pre-positioned dispensers 60 allow a technician to secure the connectors 46 without having to transition in and out of the space 56 between the hub frame 32 and the spinner 34 numerous times in order to re-supply himself/herself with fasteners 52. Instead, the technician may enter the space 56 between the hub frame 32 and the spinner only once, and without carrying any fasteners on his/her person. Accordingly, the process is less labor intensive and more time efficient. Moreover, the chances of dropping a fastener 52 from a pocket or pouch are significantly reduced. In this regard, the technician only has to deal with a single fastener 52 at a time, while the remaining fasteners remain secure within the dispensers 60 and at a location other than on his/her person.

While aspects of the invention have been described with the dispenser 60 coupled to the outer ring 40 of the pitch bearing 36, it should be recognized that benefits of the present invention might also be achieved with the dispenser being positioned at other locations. By way of example, the dispenser may be located on the inner ring 38 of the pitch bearing 36. Although the inner ring 38 may be accessible from the interior of the hub frame 32, the dispenser 60 allows the technician to selectively access one fastener 52 at a time for securing to a connector 46, and avoid having a pouch or pocket full of fasteners 52. Aspects of the invention also provides advantages to locating the large number of fasteners 52, which collectively are relatively heavy, atop the tower 12 with placement of the rotor hub atop the tower.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A rotor hub for a wind turbine, comprising:
   a hub frame having at least one blade attachment site configured for attachment of a wind turbine blade to the hub frame; and
   a dispenser coupled to the hub frame, the dispenser having a housing configured to contain one or more fasteners, wherein the one or more fasteners is selectively releasable from the dispenser to facilitate attachment of the wind turbine blade to the hub frame.

2. The rotor hub according to claim 1, wherein the hub frame includes a pitch bearing at the at least one blade attachment site, wherein the pitch bearing is configured to be attached to the wind turbine blade.

3. The rotor hub according to claim 2, wherein the pitch bearing includes an inner ring and an outer ring rotatable relative to each other, wherein the inner ring is coupled to the hub frame and the outer ring is configured to be coupled to the wind turbine blade.

4. The rotor hub according to claim 3, wherein the rotor hub further comprises a spinner, wherein the outer ring is disposed in a space between an exterior of the hub frame and the spinner.

5. The rotor hub according to claim 1, further comprising a plurality of dispensers, each of the plurality of dispensers including the dispenser including a plurality of fasteners including the one or more fasteners, wherein the plurality of dispensers is coupled to the hub frame and distributed about a periphery of the at least one blade attachment site.

6. The rotor hub according to claim 5, wherein each of the plurality of dispensers is coupled to the outer ring of the pitch bearing.

7. The rotor hub according to claim 5, wherein each of the plurality of dispensers comprises:
   an elongate hollow body having a first end, a second end, and an interior passage between the first and second ends, wherein the plurality of fasteners is positioned within the interior passage;
   at least one tab at the first and/or second end of the elongate hollow body to prevent movement of a fastener of the plurality of fasteners out of the dispenser through the first and/or second end; and
   at least one connecting flange for coupling the dispenser to the hub frame.

8. The rotor hub according to claim 7, wherein for each dispenser of the plurality of dispensers the elongate hollow body includes a removable portion, and wherein when the removable portion is removed, the plurality of fasteners is accessible and selectively removable from the dispenser.

9. The rotor hub according to claim 8, wherein for each dispenser of the plurality of dispensers the elongate hollow body includes a pair of tear lines that facilitate separation of the removable portion from the elongate hollow body.

10. The rotor hub according to claim 8, wherein for each dispenser of the plurality of dispensers the tear lines are formed in an insert.

11. The rotor hub according to claim 8, wherein for each dispenser of the plurality of dispensers the elongate hollow body defines a pair of spring fingers upon removal of the removable portion, the spring fingers configured to be flexed so as to allow a selected fastener of the plurality of fasteners to be removed from the dispenser while retaining any remaining fasteners of the plurality of fasteners within the dispenser.

12. The rotor hub according to claim 5, wherein each of the plurality of dispensers has a two-part construction, comprising:
   a base member having an elongate body with a first end, a second end, and an open channel between the first and second ends; and
   an insert having an elongate body with a first end, a second end, and an interior passage between the first and second ends, wherein the plurality of fasteners is positioned within the interior passage,
   wherein the insert is positioned in the open channel of the base member to couple the insert with the base member and thereby form the dispenser at least one tab at the first and/or second end of the elongate body of the base member to prevent movement of a fastener of the plurality of fasteners out of the dispenser through the first and/or second end of the insert, and at least one connecting flange for coupling the dispenser to the hub frame.

13. The rotor hub according to claim 12, wherein for each dispenser of the plurality of dispensers the base member includes the at least one tab and the at least one connecting flange.

14. The rotor hub according to claim 12, wherein for each dispenser of the plurality of dispensers the base member and the insert are formed from different materials.

15. The rotor hub according to claim 14, wherein for each dispenser of the plurality of dispensers the base member is formed from a material having a hardness greater than a hardness of a material from which the insert is formed.

16. The rotor hub according to claim 14, wherein for each dispenser of the plurality of dispensers the base member is formed from a metal and the insert is formed from a rubber material.

17. The rotor hub according to claim 1, wherein the one or more fasteners comprise threaded nuts.

18. A wind turbine construction, comprising:
   a tower; and
   a rotor hub according to claim 1 positioned atop the tower.

19. A method of attaching at least one wind turbine blade to a wind turbine rotor hub, comprising:
   providing a wind turbine hub frame having at least one blade attachment site for attachment of the at least one wind turbine blade;
   providing a dispenser coupled to the hub frame, the dispenser having a housing configured to contain one or more fasteners;

positioning the at least one wind turbine blade adjacent the at least one blade attachment site on the hub frame; and securing the at least one wind turbine blade to the hub frame at the at least one blade attachment site using the one or more fasteners from the dispenser.

20. The method according to claim 19, wherein providing a wind turbine hub frame further comprises:

erecting a wind turbine tower at a wind turbine installation site; and coupling the hub frame atop the tower, wherein the coupling of the hub frame to the top of the tower precedes securing the at least one wind turbine blade to the hub frame.

21. The method according to claim 19, further comprising providing a plurality of dispensers including the dispenser, each dispenser including a plurality of fasteners including the one or more fasteners, wherein the plurality of dispensers are coupled to the hub frame and distributed about a periphery of the blade attachment site.

22. The method according to claim 21, wherein the plurality of dispensers are coupled to the hub frame prior to the coupling of the hub frame atop the tower.

23. The method according to claim 22, wherein the plurality of dispensers are coupled to the hub frame at a manufacturing site for the hub frame.

24. The method according to claim 21, further comprising for each of the plurality of dispensers: removing a portion of the dispenser to provide access to the plurality of fasteners in the dispenser.

25. The method according to claim 24, wherein for each of the plurality of dispensers: removing a portion of the dispenser further comprises tearing a portion of the dispenser disposed between a pair of tear lines in the dispenser.

26. The method according to claim 24, further comprising for each of the plurality of dispensers: flexing a pair of spring arms to remove a selected fastener of the plurality of fasteners from the dispenser, the spring arms retaining any remaining fasteners of the plurality of fasteners within the dispenser.

27. The method according to claim 19, wherein securing the at least one wind turbine blade to the hub frame further comprises securing the at least one wind turbine blade to a pitch bearing on the hub frame.

28. The method according to claim 27, further comprising securing the at least one wind turbine blade to an outer ring of the pitch bearing.

29. The method according to claim 28, wherein the outer ring of the pitch bearing is external to the hub frame, and wherein the at least one wind turbine blade is coupled to the outer ring of the pitch bearing in a space between an exterior of the hub frame and a spinner of the rotor hub.

30. The method according to claim 19, wherein the one or more fasteners includes one or more threaded nuts, and securing the at least one wind turbine blade to the hub frame comprises tightening the one or more threaded nuts to one or more threaded ends of a connector extending from the at least one wind turbine blade.

31. A rotor hub for a wind turbine, comprising:

a hub frame having at least one blade attachment site configured for attachment of a wind turbine blade to the hub frame; and a dispenser coupled to the hub frame, the dispenser having a housing configured to contain one or more fasteners, wherein the housing includes a removable portion, and wherein when the removable portion is removed, the one or more fasteners is accessible and selectively removable from the dispenser to facilitate attachment of the wind turbine blade to the hub frame.

* * * * *